(12) United States Patent
Kwon et al.

(10) Patent No.: US 8,875,037 B2
(45) Date of Patent: Oct. 28, 2014

(54) TERMINAL APPARATUS AND METHOD FOR PERFORMING FUNCTION THEREOF

(75) Inventors: Soon-young Kwon, Suwon-si (KR); Jong-woo Jung, Seoul (KR); Young-wan Seo, Yongin-si (KR); In-sik Myung, Incheon-si (KR); Joo-kyung Woo, Seoul (KR); Yeo-jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1104 days.

(21) Appl. No.: 12/433,504

(22) Filed: Apr. 30, 2009

(65) Prior Publication Data

US 2009/0313567 A1    Dec. 17, 2009

(30) Foreign Application Priority Data

Jun. 16, 2008    (KR) .......................... 10-2008-0056258

(51) Int. Cl.
*G06F 3/048*    (2013.01)
*G06F 3/0488*    (2013.01)
*G06F 3/0486*    (2013.01)
*G06F 3/0482*    (2013.01)

(52) U.S. Cl.
CPC ............ *G06F 3/0482* (2013.01); *G06F 3/0488* (2013.01); *G06F 3/0486* (2013.01)
USPC .......................................... 715/769; 715/830

(58) Field of Classification Search
CPC .... G06F 3/0482; G06F 3/0488; G06F 3/0486

USPC ..................................................... 715/769, 830
See application file for complete search history.

(56) References Cited

U.S. PATENT DOCUMENTS

| | | | | |
|---|---|---|---|---|
| 5,781,181 A * | 7/1998 | Yanai et al. | .................... | 345/173 |
| 5,835,919 A * | 11/1998 | Stern et al. | .................... | 715/209 |
| 5,923,323 A | 7/1999 | Chiu et al. | | |
| 6,208,340 B1 * | 3/2001 | Amin et al. | .................... | 715/808 |
| 6,545,669 B1 * | 4/2003 | Kinawi et al. | ................. | 345/173 |

(Continued)

FOREIGN PATENT DOCUMENTS

JP    3992788 B2    8/2007
JP    2007-293511    11/2007

(Continued)

OTHER PUBLICATIONS

"Rearranging or removing widgets and icons on your home screen", taken from https://support.htc.com, published Sep. 1, 2006.*

(Continued)

*Primary Examiner* — William Bashore
*Assistant Examiner* — Gregory A Distefano
(74) *Attorney, Agent, or Firm* — NSIP Law

(57) ABSTRACT

A terminal apparatus and a method of performing a function thereof are disclosed. A list is scrolled in response to a grab-and-drag operation occurring in a scroll direction in a state in which the list is displayed, a particular object is moved in a dropped area in response to a particular object of the list being dragged and dropped in a direction perpendicular to the scroll direction of the list, and an object which is pressed during equal to or more than a predetermined time in a state in which an application is displayed is moved by a drag.

20 Claims, 15 Drawing Sheets

(56) References Cited

U.S. PATENT DOCUMENTS

| | | |
|---|---|---|
| 6,938,221 B2 * | 8/2005 | Nguyen .................. 715/863 |
| 7,565,618 B2 * | 7/2009 | Sheasby et al. ............. 715/769 |
| 7,683,889 B2 * | 3/2010 | Rimas Ribikauskas et al. ................ 345/173 |
| 2004/0100479 A1 * | 5/2004 | Nakano et al. ............. 345/700 |
| 2004/0150630 A1 * | 8/2004 | Hinckley et al. ............. 345/173 |
| 2006/0112335 A1 * | 5/2006 | Hofmeister et al. ......... 715/701 |
| 2007/0157089 A1 * | 7/2007 | Van Os et al. ............... 715/702 |
| 2008/0165153 A1 * | 7/2008 | Platzer et al. ............... 345/173 |
| 2009/0153288 A1 * | 6/2009 | Hope et al. ................ 340/3.1 |
| 2009/0187842 A1 * | 7/2009 | Collins et al. .............. 715/769 |
| 2009/0282332 A1 * | 11/2009 | Porat ........................ 715/702 |
| 2009/0293007 A1 * | 11/2009 | Duarte et al. ............... 715/767 |

FOREIGN PATENT DOCUMENTS

| | | |
|---|---|---|
| JP | 2008-012304 | 1/2008 |
| KR | 10-2007-0113018 | 11/2007 |
| KR | 10-2007-0113019 | 11/2007 |
| KR | 10-2007-0113019 A | 11/2007 |

OTHER PUBLICATIONS

Korean Office Action issued Apr. 30, 2014 in counterpart Korean Application No. 10-2008-0056258 (10 pages including English translation).

* cited by examiner

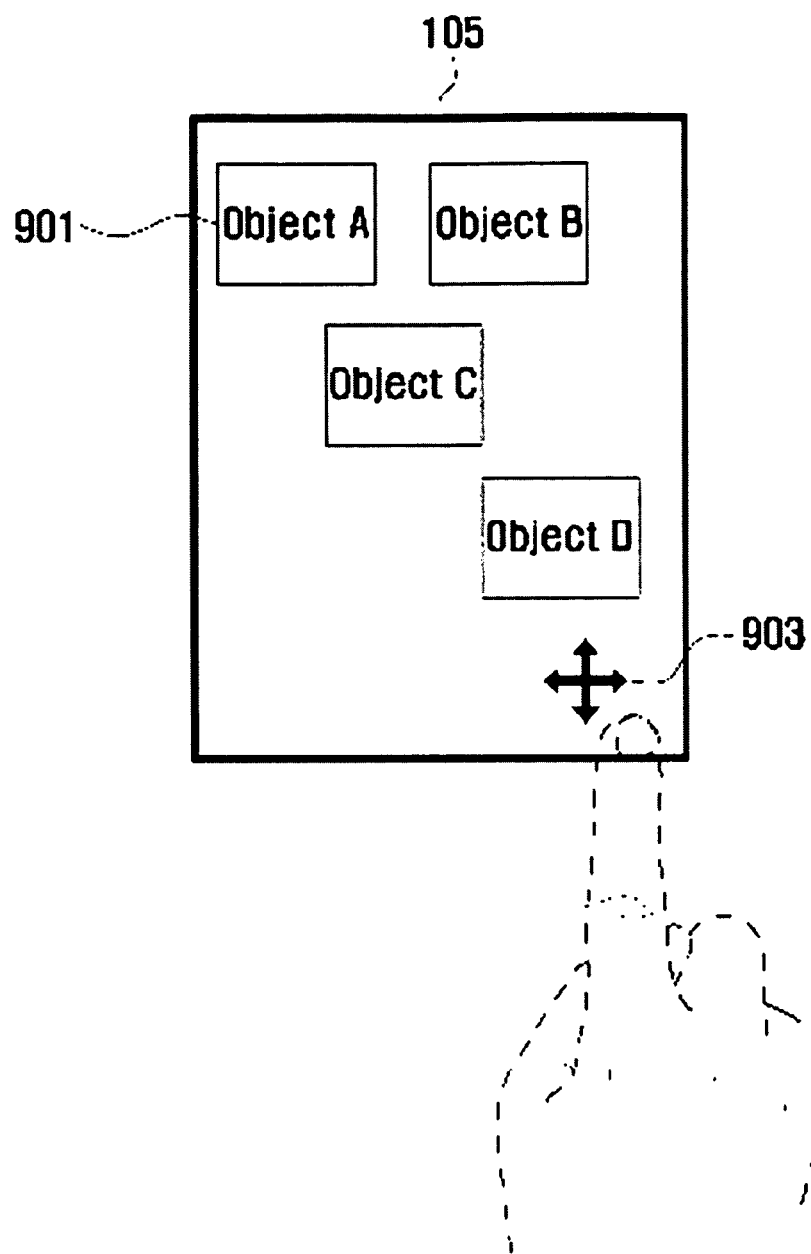

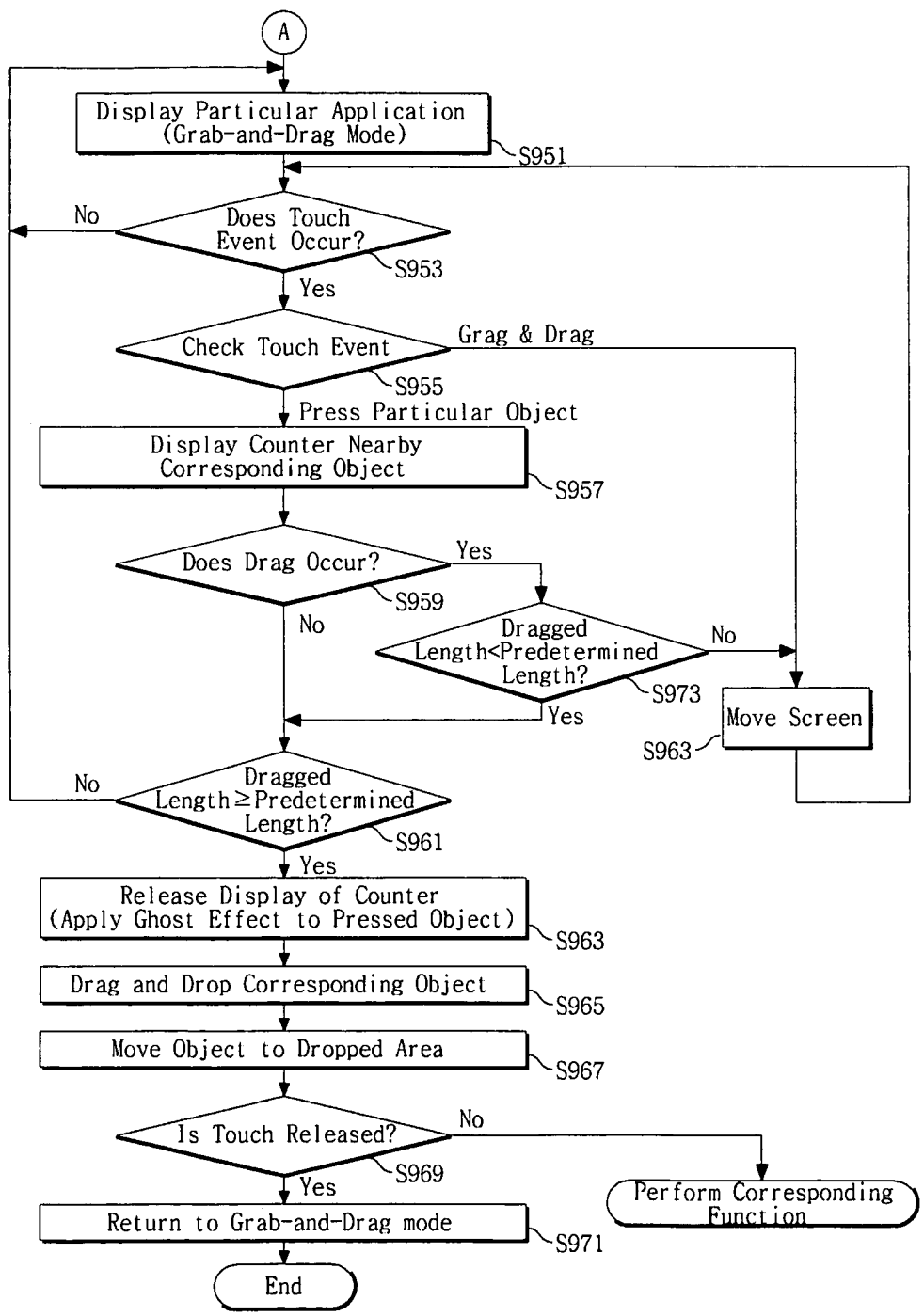

TERMINAL APPARATUS AND METHOD FOR PERFORMING FUNCTION THEREOF

CROSS-REFERENCE TO RELATED APPLICATION(S)

This application claims the benefit under 35 U.S.C. §119(a) of a Korean Patent Application No. 10-2008-56258, filed on Jun. 16, 2008, the disclosure of which is incorporated herein in its entirety by reference.

BACKGROUND

1. Field

The following description relates to a terminal apparatus and a method of performing a function thereof, and more particularly, to a method of performing a function of a terminal apparatus including a touch screen.

2. Description of the Related Art

A conventional touch screen includes a screen with a user interface (UT) which allows a user to touch the screen to input information or a command to a terminal apparatus. The touch screen may be used in various terminal apparatuses such as cellular telephones, smart phones, Palm Personal Computers (PCs) and Personal Digital Assistants (PDAs). Also, in response to a recent trend of a reduction in size and weight of terminal apparatuses, touch screens are also becoming smaller in size and weight.

However, a terminal apparatus with a touch screen may be difficult for the user to utilize due to restrictions caused by specific characteristics of the touch screen. In particular, in the case of a terminal apparatus with a small-sized screen, selection and/or inputting of desired information may be difficult for the user.

For example, when scrolling through a list, it may be difficult to control scrolling if a touch area is small. That is, if scrolling through a list is performed using a scroll bar and/or an arrow button, but the touch screen is of a small size, the scroll bar and/or the arrow button are also relatively small, causing a difficulty in controlling the scrolling.

SUMMARY

In one general aspect, there is provided a method of performing a function of a terminal apparatus with a touch screen, the method including in response to a touch event occurring in a state in which a list is displayed, checking a type of the touch event, in response to the checked touch event being a touch event corresponding to a scroll direction of the list, scrolling the list, and in response to the checked touch event being a touch event corresponding to a particular object of the list which occurs in a direction perpendicular to the scroll direction of the list, moving the particular object to a dropped area.

The touch event corresponding to the scrolling direction of the list may be a grab-and-drag event, and the touch event in the direction perpendicular to the scroll direction of the list may be a drag-and-drop event.

The method may further include, in response to a drag with a dragged length which is equal to or more than a predetermined length occurring in the direction perpendicular to the scroll direction, moving the particular object to a dropped area, and in response to a drag with a dragged length which is less than the predetermined length occurring, ignoring the drag operation.

The method may further include, in response to the checked touch event being a drag corresponding to a particular object of the list which occurs in the direction perpendicular to the scroll direction of the list, selecting the dragged particular object, and in response to the selected particular object being dragged and dropped, moving the particular object to the dropped area.

The method may further include, in response to a drag corresponding to the particular object occurring, checking whether the dragged length is equal to or more than a predetermined length, and in response to the dragged length being equal to or more than the predetermined length, moving the particular object, and in response to the dragged length being less than the predetermined length, selecting the particular object.

The method may further include, after the selecting of the particular object, in response to the selected particular object being dragged with a dragged length which is less than the predetermined length in a direction perpendicular to the scroll direction, releasing the selection of the particular object.

The method may further include, after the selecting of the particular object, in response to a touch event corresponding to the scrolling direction occurring in a particular area of the list, scrolling the list.

The method may further include, after the scrolling of the list, in response to a drag corresponding to a different object of the list occurring in a direction perpendicular to the scroll direction, selecting the dragged different object, and repetitively performing the selecting of the different object to select a plurality of objects, and moving the selected objects by a drag and drop.

The method may further include, in response to a touch event occurring in a state in which a particular application is displayed by executing a particular object of the list, checking a type of the touch event, in response to the checked touch event being a press on a particular object of the application, checking whether a pressed time is equal to or more than a predetermined time, and in response to the pressed time being equal to or more than the predetermined time, selecting the pressed object and moving the pressed object by a drag and drop.

In response to the application being displayed, an initial mode may be a grab-and-drag mode in which an application part displayed on the touch screen is moved, and in response to a time that the particular object is pressed being equal to or more than the predetermined time, an object-drag mode in which only a particular object of the displayed application is moved may be executed.

In response to the particular object being displayed, a counter to indicate the pressed time may be displayed, and in response to the pressed time being equal to or more than the predetermined time, a display of the counter may be released.

The selecting of the pressed object may include, in response to a different object of the application being pressed during a time equal to or more than the predetermined time after the pressed object is selected, selecting the different object, and repetitively performing the selecting of the different object to select a plurality of objects, and moving the selected objects by a drag and drop.

The method may further include, in response to the checked touch event being a grab-and-drag event or in response to a drag with a dragged length which is equal to or more than a predetermined time in a state in which a particular object of an application being pressed, moving an application part displayed on the touch screen.

In another aspect, there is provided a terminal apparatus, including a touch screen to receive a touch input, and a controller to control scrolling according to a touch event occurring in a scroll direction in a list in a state in which the list is displayed, and to control movement or selection of a particular object of the list according to a touch event occurring in a direction perpendicular to the scroll direction.

The controller may control the scrolling in response to a grab-and-drag occurring in the scroll direction, move the particular object in response to a drag-and-drop occurring in a direction perpendicular to the scroll direction, and select the particular object in response to a drag occurring in a direction perpendicular to the scroll direction.

The controller may move the particular object in response to a drag with a dragged length which is equal to or more than a predetermined length occurring in a direction perpendicular to the scroll direction, and ignore an occurrence of a drag with a dragged length which is less than the predetermined length.

The controller may move the particular object to a dropped area in response to a drag-and-drop event corresponding to the particular object selected by a drag which occurs in a direction perpendicular to the scroll direction occurring.

In response to a drag corresponding to the particular object occurring, the controller may move the particular object if a dragged length is equal to or more than a predetermined length and select the dragged particular object if the dragged length is less than the predetermined length.

The controller may release the selection of the particular object in response to the selected particular object being dragged with a dragged length which is less than a predetermined length in a direction perpendicular to the scroll direction.

In response to a drag being detected in a particular area of the list, the controller may scroll the list, select different objects of the list by a drag in a direction perpendicular to the scroll direction and move the selected objects by a drag and drop.

Other features and aspects will be apparent from the following detailed description, the drawings, and the claims.

BRIEF DESCRIPTION OF THE DRAWINGS

FIGS. 9A and 9B illustrate screen examples displayed on a touch screen of the terminal apparatus.

FIG. 10 is a flowchart illustrating the method of FIG. 8 in detail.

Figure 1:
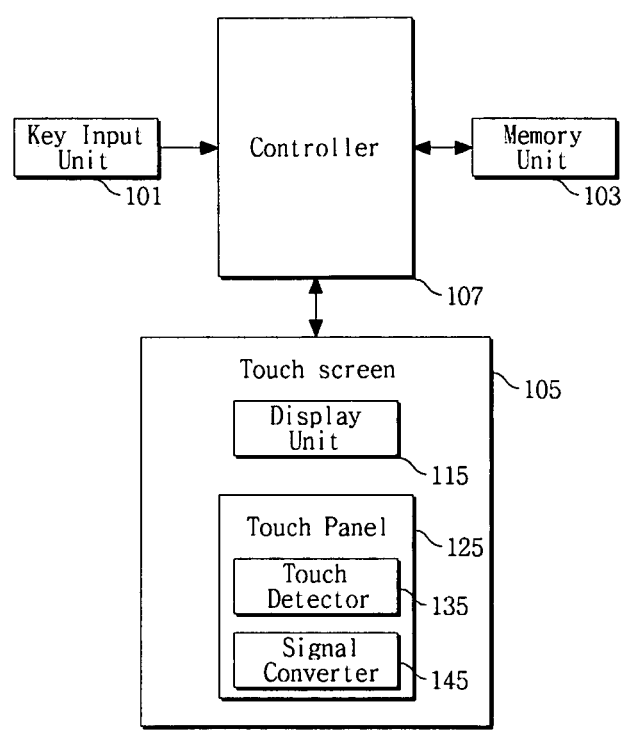
FIG. 1 is a block diagram illustrating an exemplary terminal apparatus which performs a function.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In exemplary embodiments described below, a term "touch" denotes a status in which a user's finger or a stylus pen and a touch screen come in contact with each other. A term "grab-and-drag" signifies an operation carried out when a user moves a finger or a stylus pen while in touching a touch screen. Part of an application displayed on a screen is scrolled through by a grab and drag. A term "drag-and-drop" indicates an operation carried out when a user moves a finger or a stylus pen while touching an object on a touch screen and subsequently releasing the finger or the stylus pen from the touch screen. An object displayed on the touch screen may be moved by the drag and drop operation.

A term "press" is an operation which is carried out when a user continuously touches a touch screen and does not move a finger or a stylus pen. A term "object drag" is an operation carried out when a user moves a finger or a stylus pen while touching a particular object of an application displayed on a touch screen. An "object-drag mode" can be switched to from a "grab-and-drag mode" which is set as an initial mode when an application is displayed. A screen is moved in the "grab-and-drag mode," while only a particular object is moved in the "object-drag mode.

Here, "grab-and-drag", "drag-and-drop", "press", and "object drag" are different types of touch events to perform particular functions while touching a touch screen.

A terminal apparatus according to exemplary embodiments includes a touch screen to provide a user with a convenient interface, and various information communication devices and multimedia devices such as a mobile terminal, a mobile telephone, a wireless/wire line telephone, a Portable Multimedia Player (PMP), a Personal Digital Assistant (PDA), a smart phone, and an MP3 player, are examples of the terminal apparatus.

FIG. 1 is a block diagram illustrating an exemplary terminal apparatus which performs a function.

Referring to FIG. 1, a terminal apparatus includes a key input unit 101, a memory unit 103, a touch screen 105, and a controller 107.

The key input unit 101 receives a user's operation signal to control an operation of the terminal apparatus. The key input unit 101 performs an operation to select a particular mode such as a list display mode and an application display mode and an operation to turn power on and/or off. Although FIG. 1 illustrates the terminal apparatus including the key input unit 101, the terminal apparatus can perform functions of the key input unit 101 via the touch screen 105 without including the key input unit 101.

The memory unit 103 stores application programs and information which operates the terminal apparatus. The memory unit 103 may store many different types of objects, including contents, files, and/or application programs. The objects may be stored in a predetermined list form or may be stored within an application program.

The memory unit 103 stores an application program such as a video editing tool. The application program may include a clip board to store a plurality of clips and a story board to store particular clips selected from the clip board. The clips stored in the clip board are the objects, and the story board is a drop target. The clips stored in the clip board are scrolled through one-dimensionally by a grab and drag operation, and a user moves the clips to the story board by a drag and drop operation, which will be described later with reference to FIGS. 3A and 3B.

The touch screen 105 may include a display unit 115 and a touch panel 125. The touch screen 105 functions as an input unit. The display unit 115 displays a status of the terminal apparatus. The display unit 115 may include a Liquid Crystal Display (LCD) and an LCD controller, a memory to store display data, and an LCD display element. The touch panel 125 is mounted on the display unit 115 and may include a touch detector 135 and a signal converter 145. The touch detector 135 detects a touch by detecting a variation of a physical amount, such as resistance or capacitance, when the touche screen 105 is in contact with an object. The signal converter 145 converts the variation of the physical amount into a touch signal.

The touch screen 105 visually displays various information related to a status and operation of the terminal apparatus, and detects a touch of a user. The touch screen 105 displays an object (see object 301 of FIG. 3A) list and drop targets (see drop target 303 of FIG. 3B) while in the list display mode. The touch screen 105 detects a grab-and-drag operation in a scroll direction of a list in a list area, and detects that a particular object is dragged and dropped in a direction perpendicular to the scroll direction.

The controller 107 controls overall operation of components of the terminal apparatus. The controller 107 displays a list when the list display mode is selected. The displayed list may be similar to a video editing tool. That is, the controller 107 may display a plurality of objects in a list form in a particular area of the touch screen 105 and a plurality of drop targets in a different area of the touch screen 105 when the list display mode is selected (see FIGS. 3A and 3B). A list according to the above exemplary embodiments is not limited to forms illustrated in FIGS. 3A and 3B.

The controller 107 scrolls a list where a touch event occurs in an object list area in a scroll direction, that is, where a grab-and-drag operation occurs in a scroll direction. The controller 107 moves a particular object of a list to a corresponding drop target where a touch event occurs in a direction perpendicular to the scroll direction, that is, where a drag-and-drop operation occurs in a direction perpendicular to the scroll direction. If a scroll direction of a list, i.e., a grab-and-drag direction, is a vertical direction, then an object movement direction, i.e., a drag-and-drop direction, is a horizontal direction.

Where a particular object is dragged and dropped in a direction perpendicular to a scroll direction, where a dragged length is less than a predetermined length, the controller 107 selects the particular object as in another exemplary embodiment.

The terminal apparatus according to exemplary embodiments may further include a Radio Frequency (RF) unit to perform a wireless communication function. The RF unit can include an RF transmitter to up-convert and amplify a frequency of a signal to be transmitted and an RF receiver to perform low-noise amplification of a received signal and down-convert a frequency.

Exemplary methods of performing a function of a terminal apparatus will be described below.

Figure 2:
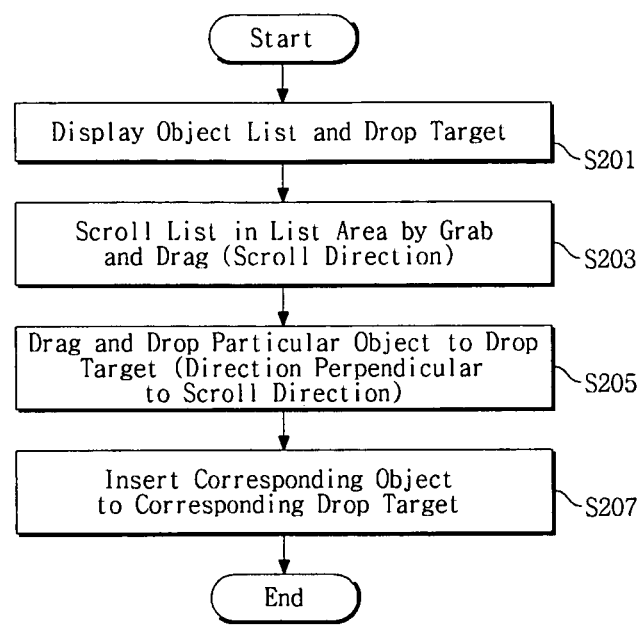
FIG. 2 is a flowchart illustrating an exemplary method of performing a function of a terminal apparatus.
Figure 3A:
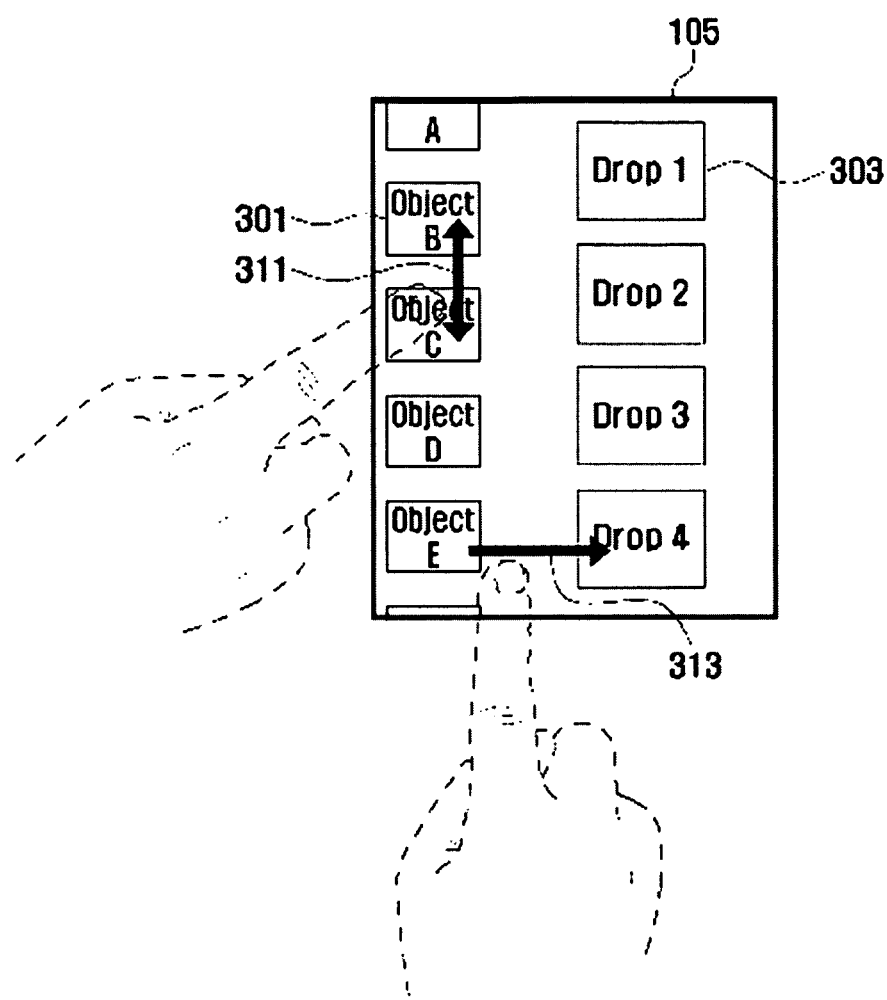
FIGS. 3A and 3B are example screens displayed on a touch screen of the terminal apparatus.
Figure 3B:
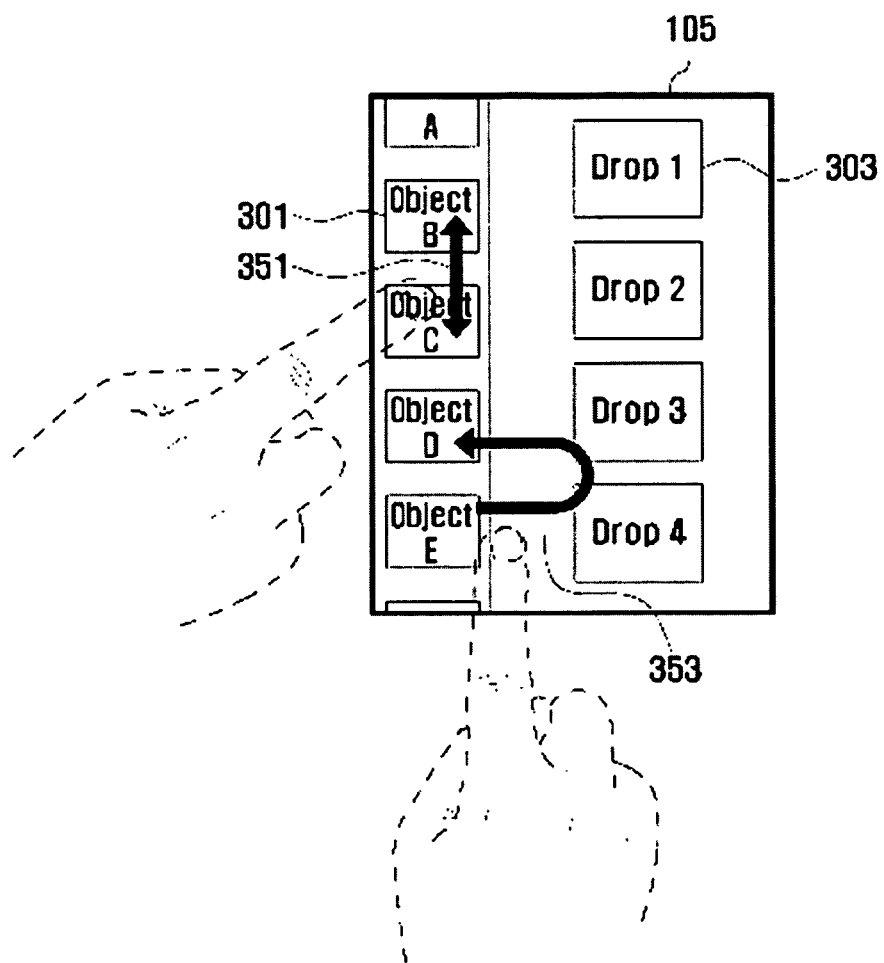

FIG. 2 is a flowchart illustrating an exemplary method of performing a function of a terminal apparatus, and FIGS. 3A and 3B are example screens displayed on the touch screen of the terminal apparatus.

A method of performing a function of a terminal apparatus according to the first exemplary embodiment will be described with reference to FIG. 2. The controller 107 displays an object list and drop targets in the list display mode (S201). FIG. 3A illustrates a screen displayed on the touch screen 105 in the list display mode. As illustrated in FIG. 3A, the controller 107 displays a plurality of objects 301 in a list form in a particular area of the touch screen 105 and a plurality of drop targets 303 in a different area of the touch screen 105 in the list display mode.

The controller 107 recognizes a grab-and-drag operation in a scroll direction in the list area and scrolls the list (S203). For example, the controller 107 recognizes that a grab-and-drag operation occurs in a scroll direction (vertical direction) of the list as illustrated by a first arrow 311 of FIG. 3A, and scrolls the list.

Next, the controller 107 recognizes that a particular object is dragged and dropped onto a particular drop target in a direction perpendicular to the scroll direction (S205). For example, the controller 107 recognizes that a drag-and-drop occurs in a direction (horizontal direction) perpendicular to the scroll direction of the list as illustrated by a second arrow 313 of FIG. 3A. FIG. 3A illustrates a screen in which an object E is dragged and dropped onto a drop target 4.

The controller 107 inserts a corresponding object into a corresponding drop target (S207). The controller 107 moves the object E to the drop target 4.

The controller 107 can insert a particular object into a different object in the list as shown in FIG. 3B. Referring to FIG. 3B, where an object list and drop targets are displayed on the touch screen 105 (S201), the controller 107 recognizes that a grab-and-drag occurs in the scroll direction in the list area and scrolls the list (S203). For example, the controller 107 recognizes that a grab-and-drag occurs in the scroll direction (vertical direction) of the list as illustrated by a third arrow 351 of FIG. 3B and scrolls the list.

Subsequently, the controller 107 recognizes that a particular object is dragged and dropped onto a different object, which is a particular drop target, in a direction perpendicular to the scroll direction (S205). For example, the controller 107 recognizes that a particular object is dragged in a direction (horizontal direction) perpendicular to the scroll direction of the list and then dropped onto a different object as illustrated by a fourth arrow 353 of FIG. 3B. FIG. 3B illustrates a screen in which an object E is dragged and dropped onto an object D. Since a list scroll function is inactivated at the moment a particular object is dragged, a different object in the list or an object itself can be a drop target. Then, the controller 107 inserts a corresponding object into an object which is a drop target (S207).

FIG. 2 illustrates an example in which a grab-and-drag operation is performed in the list area in the scroll direction, and thereafter a particular object is dragged and dropped onto a drop target in a direction perpendicular to the scroll direction,. For example, a grab-and-drag operation can be performed, a drag-and-drop operation can be performed, a drag-and-drop operation can be performed after a grab-and-drag operation, or a grab-and-drag operation can be performed after a drag-and-drop operation according to an input of a user in the list display mode, which will be described later.

Figure 4:
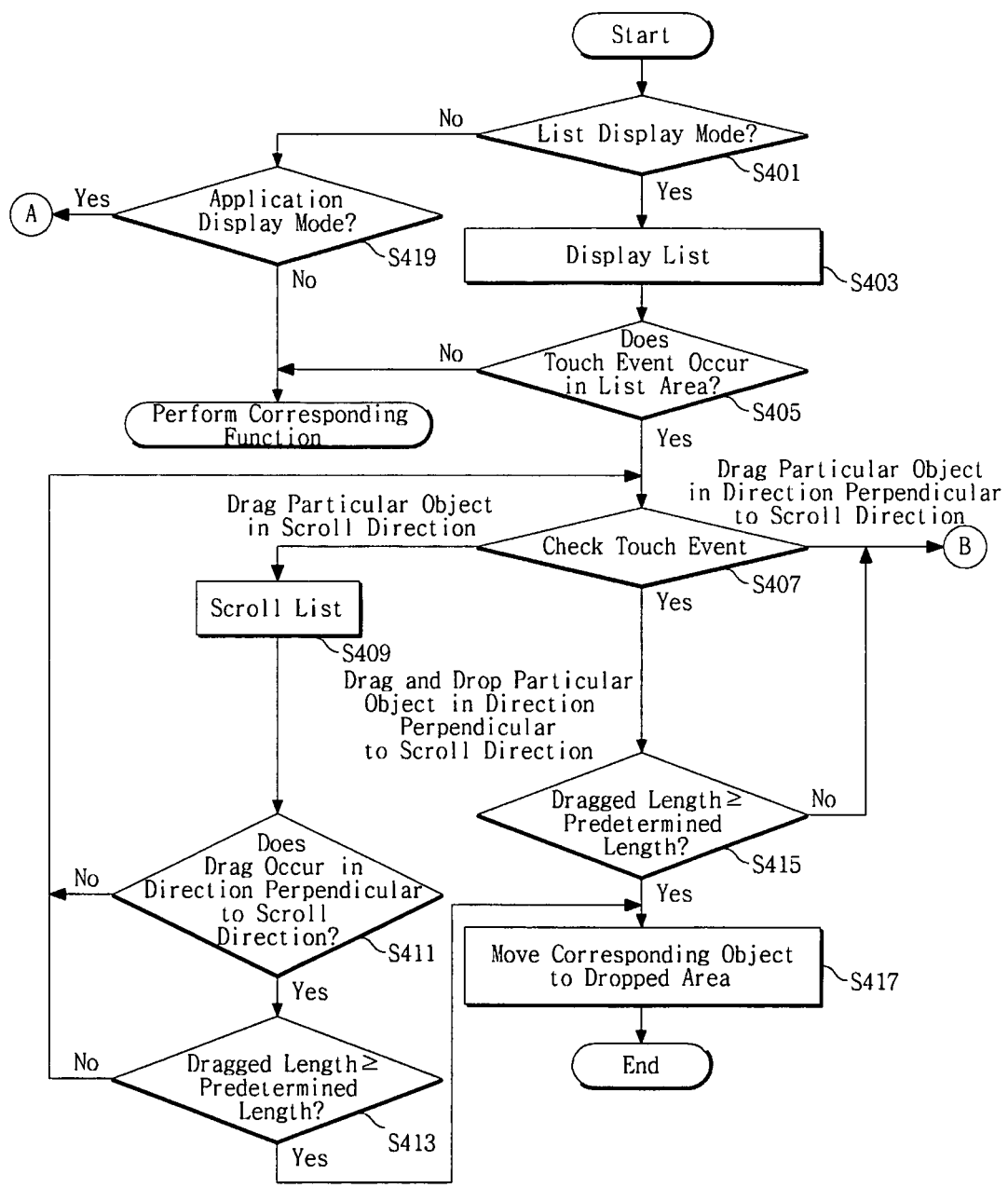
FIG. 4 is a flowchart illustrating the method of FIG. 1 in detail.

The exemplary method of performing a function of a terminal apparatus will be described below in further detail. FIG. 4 is a flowchart illustrating the exemplary method of performing a function of a terminal apparatus according to the first exemplary embodiment in further detail.

Referring to FIG. 4, the controller 107 checks whether the list display mode is requested (S401). Where the list display mode is not requested, the controller 107 checks whether the application display mode is requested (S415). Where the application display mode is requested, a procedure according to another exemplary embodiment, which will be described later, is performed.

Where the list display mode is requested, the controller 107 displays the list as illustrated in FIG. 3A (S403) and checks whether a touch event occurs in the list area (S405).

Where a touch event occurs in the list area, the controller 107 checks which type of touch event has occurred (S407). Touch events that can occur in the list display mode include a grab-and-drag operation in the scroll direction in the list area, a drag-and-drop operation in which a particular object is dragged and dropped in a direction perpendicular to the scroll direction, and an object drag operation in which a particular object is dragged in a direction perpendicular to the scroll direction. A touch event in which a particular object is dragged in a direction perpendicular to the scroll direction will be described later with reference to another exemplary embodiment.

Where the touch event checked in operation S407 is a grab-and-drag operation in the scroll direction in the list area, the controller 107 scrolls the list (S409). For example, the controller 107 scrolls the list where a grab-and-drag operation occurs in a direction of the first and third arrows 311 and 351 as illustrated in FIGS. 3A and 3B.

Then, the controller 107 checks whether a drag occurs in a direction perpendicular to the scroll direction (S411). Since a drag may be caused by slight handshaking during operation S409, the controller 107 performs operation S411. Where a drag does not occur in a direction perpendicular to the scroll direction, the controller 107 returns to operation S407 to perform a function according to an occurrence of a touch event.

Where a drag occurs in a direction perpendicular to the scroll direction, the controller 107 checks whether a dragged length is equal to or more than a predetermined length (S413). The controller 107 performs operation S413 to check whether a drag that occurs during list scrolling is a drag to move a particular object or a drag caused by the user's handshaking.

Where the dragged length is less than the predetermined length, the controller 107 ignores the drag. However, where the dragged length is equal to or more than the predetermined length, the controller 107 performs operation S417 described below.

Where the touch event checked in operation S407 is a drag-and-drop operation in which a particular object is dragged and dropped in a direction perpendicular to the scroll direction in the list area, the controller 107 checks whether the dragged length is equal to or more than the predetermined length (S415). Operation S415 is performed to check whether a drag-and-drop is a drag-and-drop to move an object or a drag to select an object as in another exemplary embodiment. However, where the dragged length is less than the predetermined length, the controller 107 performs a process according to another exemplary embodiment described below.

Where it is determined in operation S415 that the dragged length is equal to or more than the predetermined length, the controller 107 moves a corresponding object to the dropped area (S417). The controller 107 moves the object E to the drop target 4 where a drag-and-drop occurs in a direction of the second arrow 313 as illustrated in FIG. 3A, and moves the object E to the object D where a drag-and-drop operation occurs in a direction of the third arrow 353 as illustrated in FIG. 3B.

In the terminal apparatus and the method of performing a function thereof according to the exemplary embodiment described above, scrolling can be performed by a grab and drag without using a scroll bar or an arrow button to perform scrolling. Therefore, since a small-sized touch screen may have a relatively large scroll area, performing various touch operations on the touch screen may be easier for the user.

In another exemplary embodiment, descriptions of components which are identical to or correspond to components of the above exemplary embodiment will be omitted. A terminal apparatus and a method of performing a function thereof according to the another exemplary embodiment are similar to those according to the above exemplary embodiment, but the another exemplary embodiment specifically allows a user to easily select, drag, and drop a particular object.

Referring to FIG. 1, the touch screen 105 displays an object (see object 601 of FIG. 6A) list in the list display mode. The touch screen 105 detects that a particular object is dragged in a direction perpendicular direction to the scroll direction of the list in the list area, and applies a ghost effect to the corresponding particular object to indicate selection of the particular object. For example, where the ghost effect is applied, if a drag is released in a state in which an object is dragged and moved in a right direction, the moved object returns to its original position. At this time, a selection icon (see selection icon 605 of FIG. 6C) may be displayed on the corresponding object. Alternatively, selection of the corresponding object may be indicated by a highlight effect, or by both the selection icon and the highlight effect.

The controller 107 displays the list where the list display mode is selected. The list can be displayed in, but is not limited to, a form illustrated in FIGS. 6A through 6D. Where the list display mode is selected, the controller 107 displays a plurality of objects (see object 602 of FIG. 6A) as the list.

Where a touch event corresponding to a direction perpendicular to the scroll direction of the list occurs in the list displayed on the touch screen 105, that is, where a particular object is dragged in a direction perpendicular to the scroll direction, the controller 107 applies the ghost effect to and selects the corresponding object. At this time, the selection icon which indicates selection of the corresponding object may be displayed. The controller 107 scrolls the list where a drag occurs in the scroll direction in an area of the touch screen 105 which is different from an area of the selected object.

Where a different object is dragged in a direction perpendicular to the scroll direction, the controller 107 selects the different object. That is, the controller 107 may select a plurality of objects. The controller 107 moves the corresponding object into the dropped area where at least one of the selected objects is dragged and dropped (see FIG. 6D). At this time, the user can move the corresponding object by dragging and dropping the selection icon. Where a plurality of objects are selected, even where one object is dragged and dropped, all of the selected objects may be simultaneously moved.

Where a drag occurs in a direction perpendicular to the scroll direction with respect to a particular object which is in a selected state, the controller 107 releases a selection of the selected particular object. That is, the controller 107 deletes the selection icon displayed on the selected object and changes to a general object.

Figure 5:
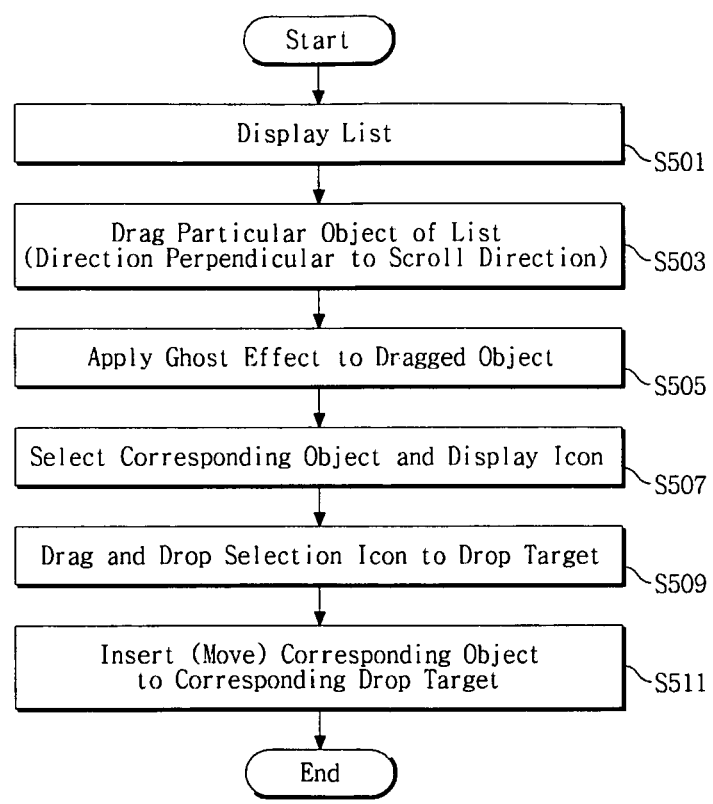
FIG. 5 is a flowchart illustrating another exemplary method of performing a function of a terminal apparatus.
Figure 6A:
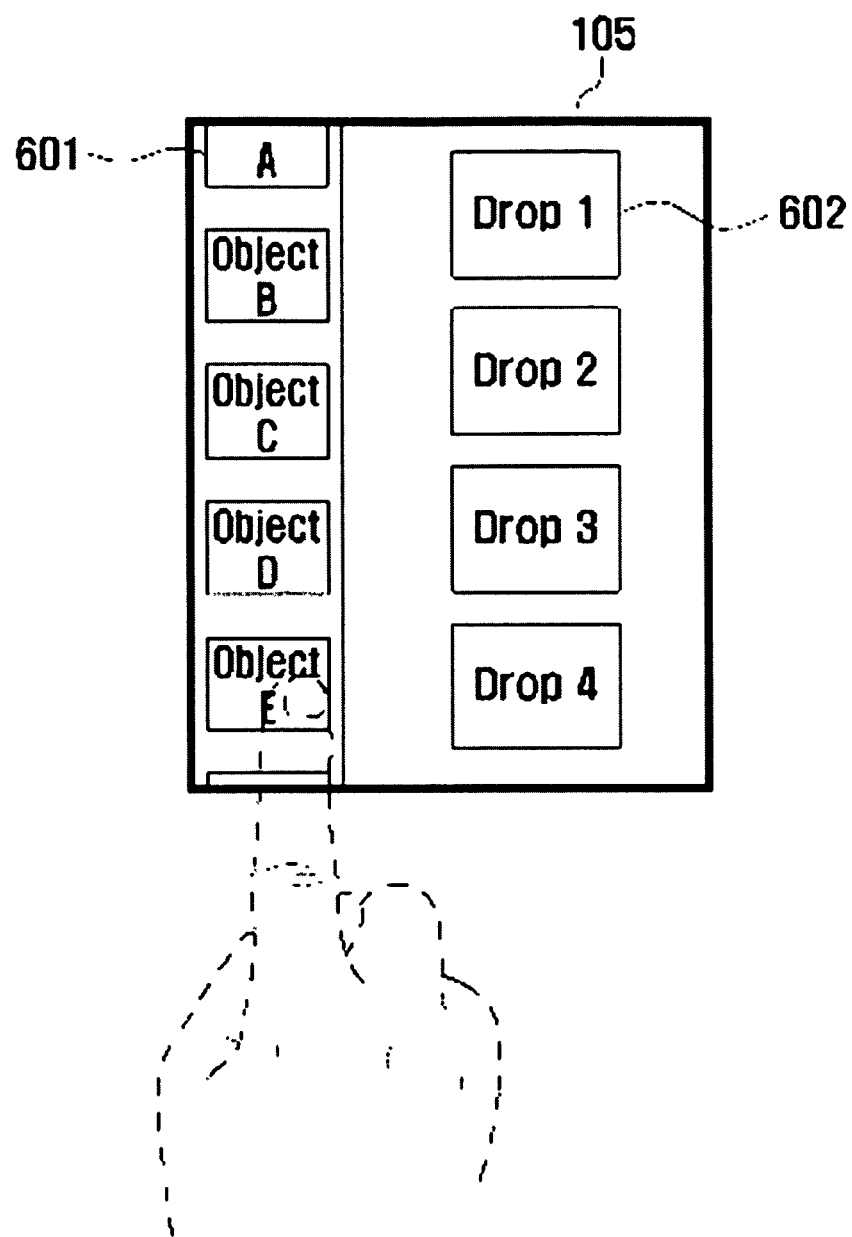
FIGS. 6A and 6B are example screens displayed on a touch screen of the terminal apparatus.
Figure 6B:
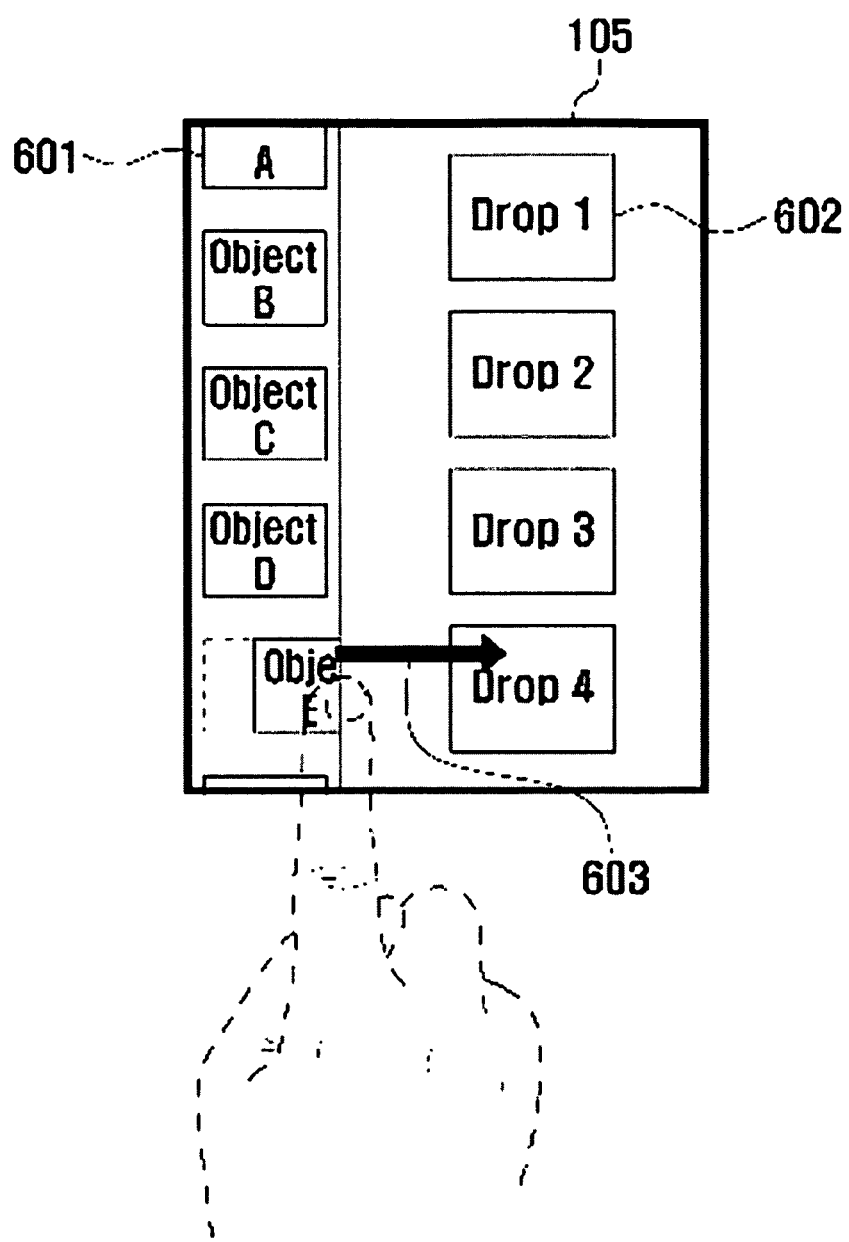

An exemplary method of performing a function of a terminal apparatus according to the another exemplary embodiment will be described below. FIG. 5 is a flowchart illustrating an exemplary method of performing a function of a terminal apparatus, and FIGS. 6A and 6B are example screens displayed on the touch screen of the terminal apparatus.

Referring to FIG. 5, the controller 107 displays an object list in the list display mode (S501). FIG. 6A illustrates a screen displayed on the touch screen 105 in the list display mode. As illustrated in FIG. 6A, the controller 107 displays a plurality of objects 601 in a list form on the touch screen 105 in the list display mode.

The controller 107 recognizes that a particular object of the list is dragged in a direction perpendicular to the scroll direction of the list (S503). FIG. 6B illustrates a screen in which a particular object is dragged in a direction perpendicular to the scroll direction of the list. As illustrated in FIG. 6B, the controller 107 recognizes that the particular object is dragged in a direction perpendicular to the scroll direction, that is, a right direction as illustrated by a fifth arrow 603.

Figure 6C:
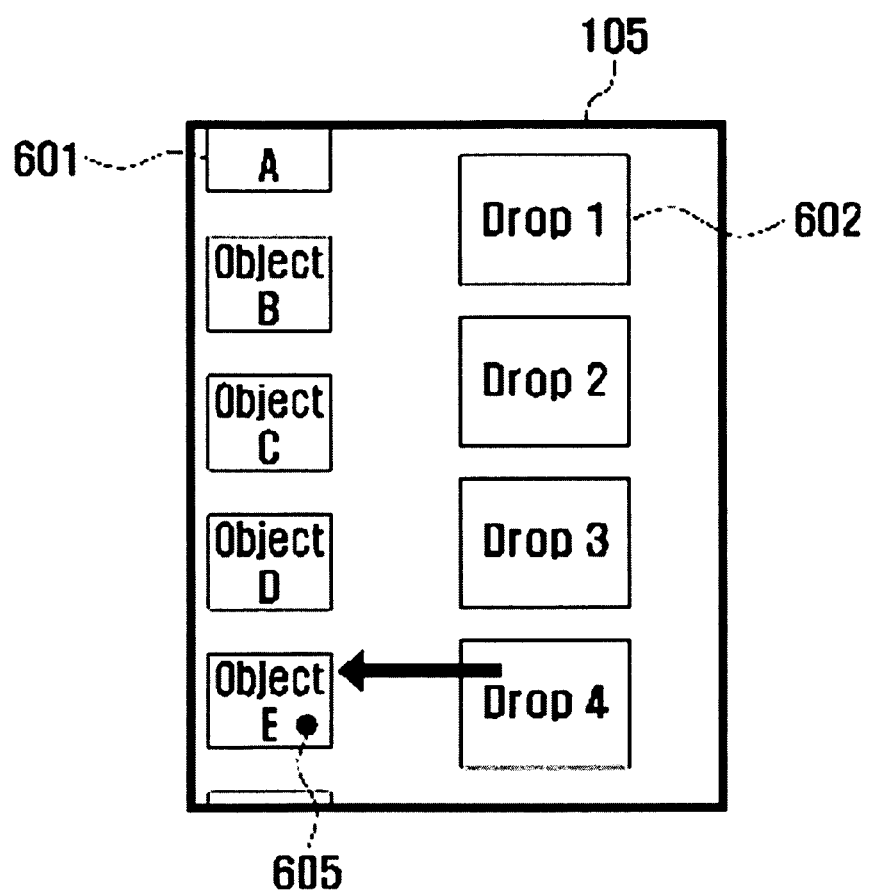

Next, the controller 107 applies the ghost effect to the dragged object (S505) and selects the dragged object (S507). At this time, the controller 107 can display the selection icon on the corresponding object. FIG. 6C illustrates a screen in which selection of the corresponding object is indicated by applying the ghost effect to the corresponding object. As illustrated in FIG. 6C, the controller 107 applies the ghost effect which moves the corresponding object in a right direction due to a drag of a right direction and then returns the corresponding object to its original position, and displays the selection icon 605 which represents selection of the corresponding object. Here, the controller 107 may indicate selection of the corresponding object by applying the highlight effect to the corresponding object instead of the selection icon 605.

Figure 6D:
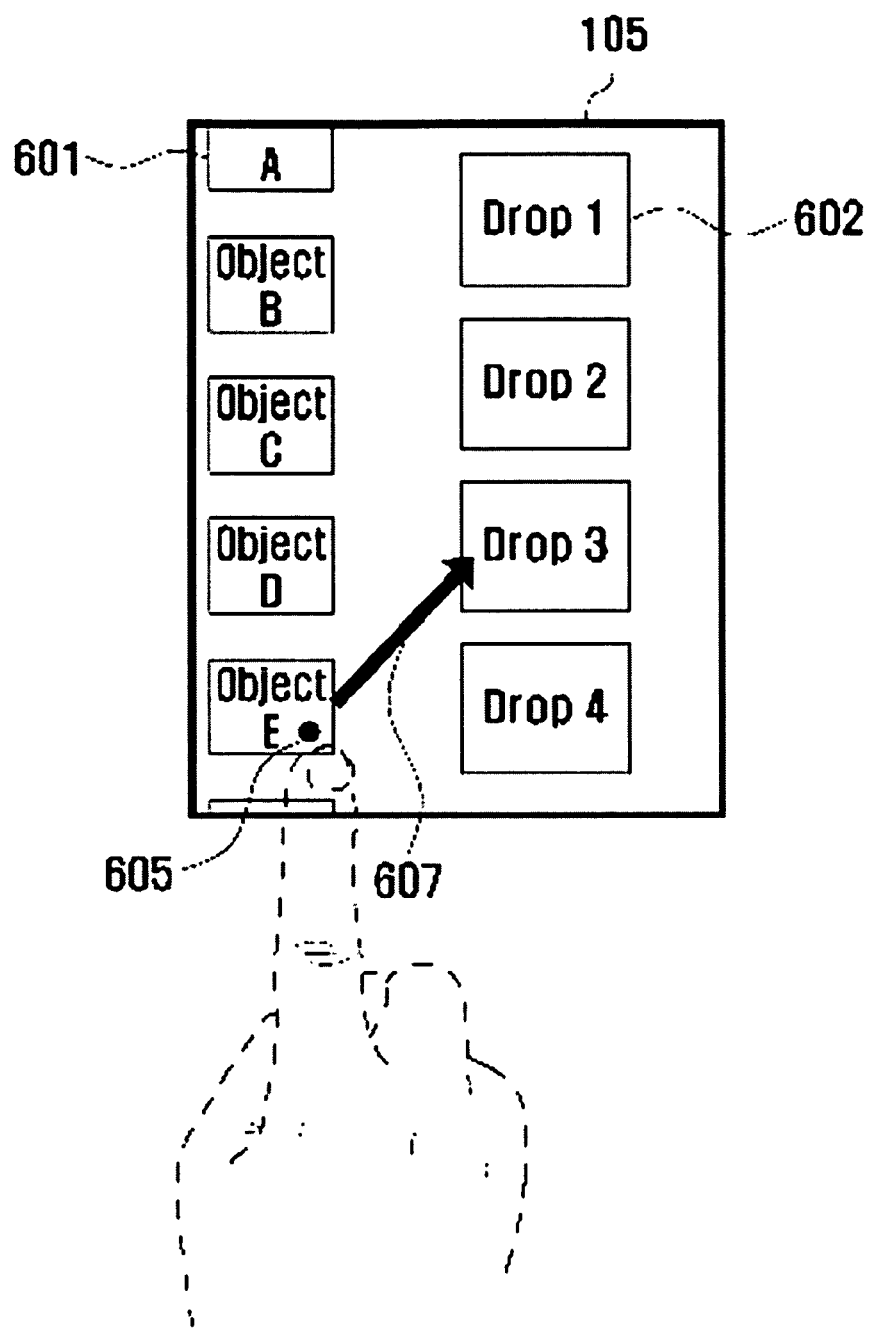

The controller 107 recognizes that the selected icon is dragged and dropped onto a drop target (S509). FIG. 6D illustrates a screen in which a particular objected is selected and then dragged and dropped. As illustrated in FIG. 6D, the controller 107 recognizes that the selected object is dragged and dropped in a direction of a sixth arrow 607. A user can touch the selection icon 605 of the selected object, that is, the object E, and drag and drop the selection icon onto a desired drop target, i.e., a drop 3. Here, the selected object is moved by dragging and dropping the selection icon, but the exemplary embodiments are not limited thereto. That is, a corresponding object can be moved by touching and then dragging and dropping part of an area of the selected object.

Next, the controller 107 inserts the corresponding object to the corresponding drop target (S511). As illustrated in FIG. 6D, the controller 107 moves the object E to the drop 3.

In FIG. 5, although only one objected may selected and then dragged and dropped, a plurality of objects may also be selected and then moved, which will be described later.

Figure 7:
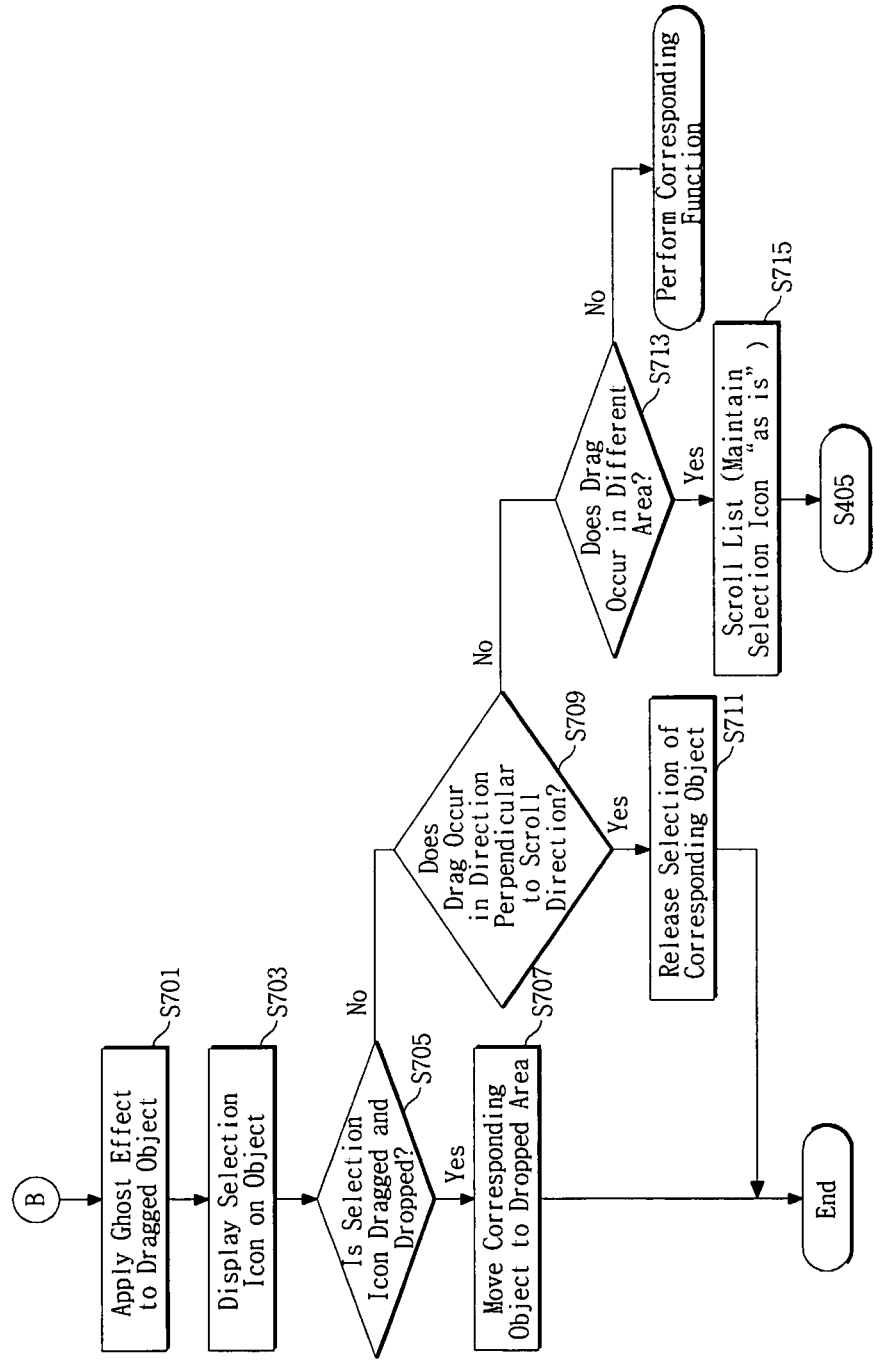
FIG. 7 is a flowchart illustrating the method of FIG. 5 in detail.

The method of performing a function of a terminal apparatus according to the another exemplary embodiment will be described below in further detail. FIG. 7 is a flowchart illustrating the method of performing a function of a terminal apparatus according to the another exemplary embodiment in further detail.

The method of performing a function of a terminal apparatus according to the another exemplary embodiment will be described with reference to FIG. 7. First, referring to FIG. 4, the controller 107 checks whether or not the list display mode is requested as illustrated in FIG. 4 (S401). Where the list display mode is requested, the controller 107 display the list illustrated in FIG. 6A (S403), and checks whether a touch event occurs in the list area (S405).

Where a touch event occurs in the list area, the controller checks which type of touch event has occurred (S407). Referring to FIG. 7, where the touch event that occurred is a drag operation in which a particular object is dragged in a direction perpendicular to the scroll direction, the controller 107 applies the ghost effect to the dragged object (S701). Where the particular object is dragged in a direction perpendicular to the scroll direction as illustrated in FIG. 6B, the ghost effect is applied to the corresponding object as illustrated in FIG. 6C.

The controller 107 displays the selection icon 605 on the corresponding object as illustrated in FIG. 6C (S703).

Next, the controller 107 checks whether the selection icon is dragged and dropped (S705). A user may move the particular object by a drag and drop where the particular object is selected. The drag-and-drop operation may be performed by touching the selection icon of the corresponding object. As illustrated in FIG. 6D, the controller 107 moves the corresponding object to the dropped area where the selection icon is dragged and dropped (S707).

Where it is determined in operation S705 that the selection icon is not dragged and dropped, the controller 107 checks whether a drag operation occurs in a direction perpendicular to the scroll direction (S709). The user may release the selection of the particular object by dragging the corresponding object in a direction perpendicular to the scroll direction. The controller 107 releases selection of the corresponding object where a drag occurs in a direction perpendicular to the scroll direction (S711).

Where it is determined in operation S709 that a drag does not occur in a direction perpendicular to the scroll direction, the controller 107 checks whether a drag occurs in an area of the touch screen excluding an area of the selected object (S713). The user may scroll through the list by dragging in the scroll direction in an area of the touch screen 105 excluding an area of the selected object. The controller 107 scrolls the list where a drag occurs in the scroll direction in an area of the touch screen 105 excluding an area of the selected object (S715). At this time, where the object is selected, the selection icon displayed on the corresponding object remains.

Thereafter, the controller 107 returns to operation S405. That is, the user may select a plurality of objects by scrolling the list and then dragging various objects in a direction perpendicular to the scroll direction.

In the another exemplary embodiment, a desired object is selected by a drag operation which occurs in a direction perpendicular to the scroll direction of the list and then moved by a drag and drop operation, but after at least one object is selected, the another exemplary embodiment may also include functions including correcting, deleting, copying, and cutting off the corresponding object.

In the terminal apparatus and the method of performing a function thereof according to the another exemplary embodiment, scrolling can be clearly discriminated from dragging and dropping, and where an object is selected by dragging, the ghost effect is applied to the selected object, whereby a new user interface (UT) is provided to a user, thereby improving user convenience.

In yet another exemplary embodiment, descriptions on components which are identical to or correspond to components of the above exemplary embodiments will be omitted. Another exemplary terminal apparatus and method of performing a function thereof are similar to those according to the above exemplary embodiments, but the another exemplary embodiment may easily perform switching between a grab-and-drag mode and an object-drag mode in the application display mode.

Referring to FIG. 1, the touch screen 105 displays an application including at least one object (see object 901 of FIG. 9A) in the application display mode. Where a touch is detected in the application display mode, the touch screen 105 displays a seventh arrow (see seventh arrow 903 of FIG. 9A) which indicates that an initial mode is a grab-and-drag mode. Where a particular object is pressed, the touch screen 105 displays a counter (see counter 905 of FIG. 9B) at a location adjacent to the pressed area. The counter indicates a time in which a particular object is pressed, and allows a user to recognize a long press time to select a particular object.

The touch screen 105 releases a display of the counter where a particular object is selected by a long press. At this time, selection of an object may be indicated by applying the ghost effect to the selected object.

Figure 9B:
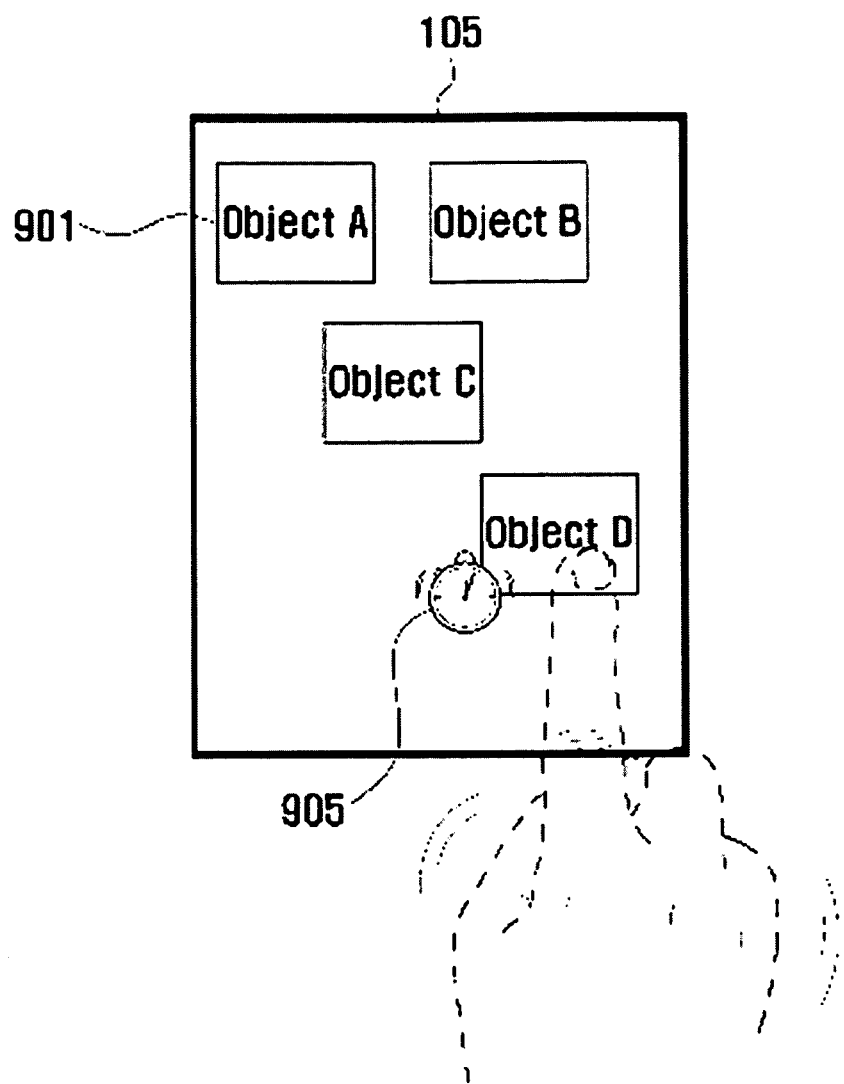

The controller 107 displays an application where the application display mode is selected. The user may select a mode to display a particular application by selecting a particular object in the list display mode as in the above exemplary embodiments. The displayed application can include a plurality of objects 901 as illustrated in FIGS. 9A and 9B. The objects 901 may include contents, files, applications, links, or texts.

The controller 107 can set a grab-and-drag mode as an initial mode where an application is displayed. Where a long press corresponding to a particular object of an application is detected, that is, where a particular object of an application is pressed during a time equal to or more than a predetermined time, the controller 107 switches to an object-drag mode and selects the corresponding object. At this time, the controller 107 may apply the ghost effect to the corresponding object in order to indicate selection of the corresponding object. For example, an object to which the ghost effect is applied can look as if it is pressed down and goes up again. Selection of the corresponding object may be indicated by the highlight effect. The controller 107 ignores movement caused by slight handshaking during a long press. That is, a drag occurring during a long press can be ignored where a dragged length is less than a predetermined length.

The controller 107 may display the counter at a location adjacent to the pressed area where a particular object is pressed, thereby allowing the user to recognize an input time during a long press. The controller 107 displays a remaining time until a predetermined time during a long press. Where the pressed time is equal to or more than the predetermined time, that is, it is recognized as a long press, the controller 107 releases a display of the counter and switches to the object-drag mode. The controller 107 may select a plurality of objects by performing a long press corresponding to a different object in a state in which a particular object is already selected.

Where the selected object is dragged and dropped in the object-drag mode, the controller 107 moves the corresponding object to the dropped area. Where a touch is released in the object-drag mode, that is, where the object is moved by a drag and drop operation and a drop is completed, the controller 107 returns to the grab-and-drag mode which is set as the initial mode where the application is displayed.

Figure 8:
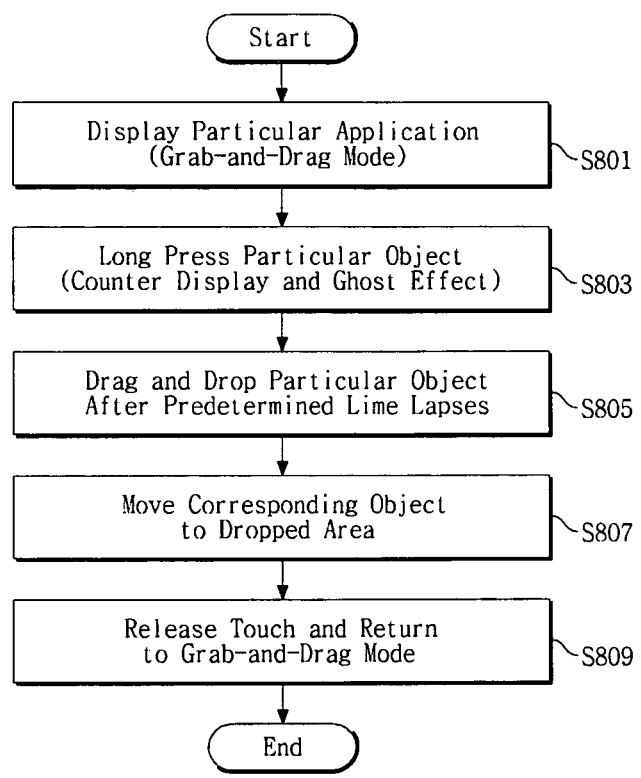
FIG. 8 is a flowchart illustrating another exemplary method of performing a function of a terminal apparatus.

A method of performing a function of a terminal apparatus according to another exemplary embodiment will be described below. FIG. 8 is a flowchart illustrating a method of performing a function of a terminal apparatus according to the another exemplary embodiment, and FIGS. 9A and 9B illustrate exemplary screen examples displayed on the touch screen of the terminal apparatus.

An exemplary method of performing a function of a terminal apparatus is described with reference to FIG. 8. Referring to FIG. 8, the controller 107 displays a particular application in the application display mode (S801). FIG. 9A illustrates a screen of the touch screen 105 in which a particular application is displayed in the application display mode. As illustrated in FIG. 9A, the controller 107 displays a particular application including a plurality of objects 901 on the touch screen 105 in the application mode. Here, the grab-and-drag mode is set as the initial mode where the application is displayed. Where a touch occurs in the grab-and-drag mode, the controller 107 displays a seventh arrow 903. The seventh arrow 903 includes four directional arrows, and where a user touches and moves the seventh arrow 903, the controller 107 scrolls and moves part of the application displayed on the touch screen 105. Here, where a touch occurs in the grab-and-drag mode, an icon other than the four-directional arrow 903 can be displayed.

The controller 107 recognizes that a particular object of the application is long-pressed (S803). At this time, the controller 107 displays the counter 905 at a location adjacent to the pressed area. Also, the ghost effect can be applied to the corresponding object. FIG. 9B illustrates a screen on which the counter 905 is displayed where a particular object is pressed. As illustrated in FIG. 9B, where a particular object is pressed, the controller 107 displays the counter 905 so that the user can recognize an input time during a long press.

Next, after a predetermined time elapses, the controller 107 recognizes that the corresponding object is dragged and dropped (S805). At this time, where a predetermined time elapses, that is, where a long press is recognized, the controller 107 releases a display of the counter and switches to the object-drag mode. Then, the controller 107 recognizes that the corresponding object is dragged and dropped by the user.

Subsequently, the controller 107 moves the corresponding object to the dropped area (S807). Where a touch is released, that is, a drop is completed, the controller 107 returns to the grab-and-drag mode which is the initial mode set where the application is displayed (S809).

The another exemplary method of performing a function of a terminal apparatus will be described below in further detail. FIG. 10 is a flowchart illustrating the another exemplary method of performing a function of a terminal apparatus in further detail.

The another method of performing a function of a terminal apparatus is described with reference to FIG. 10. First, referring to FIG. 4, the controller 107 checks whether the list display mode is requested (S401). Where the list display mode is not requested, the controller 107 checks whether or not the application display mode is requested (S415). Where the application display mode is requested, the controller 107 displays a particular application as illustrated in FIG. 10 (S951). The controller 107 display the application illustrated in FIG. 9A on the touch screen 105. At this time, the grab-and-drag mode is set as the initial mode where the application is displayed.

Subsequently, the controller 107 checks whether a touch occurs (S953), and checks which type of the touch event has occurred (S955). Touch events which may occur where a particular application is displayed include a particular object press event and a grab-and-drag event. Where a grab-and-drag event occurs in a state in which the particular application is displayed, the screen illustrated in FIG. 9A is displayed, and where a particular object is pressed, the screen illustrated in FIG. 9B is displayed.

Where it is determined in operation S953 that the touch event is a particular object press, the controller 107 displays the counter 905 at a location adjacent to the corresponding object as illustrated in FIG. 9B (S957). The controller 107 checks whether a drag occurs in a state in which the particular object is pressed (S959).

Where a drag does not occur, the controller 107 checks whether the pressed time is equal to or more than the predetermined time (S961). The controller 107 checks whether a particular object press is a long press corresponding to the switching to the object-drag mode.

Where the pressed time is equal to or more than the predetermined time, the controller 107 releases a display of the counter and selects the corresponding object (S963). At this time, the controller 107 may apply the ghost effect and the highlight effect to the corresponding object.

Next, the controller 107 recognizes a drag-and-drop corresponding to the corresponding object (S965) and moves the corresponding object to the dropped area (S967).

Subsequently, the controller 107 checks whether a touch is released (S969), and returns to the grab-and-drag mode set as the initial mode where a touch is released, that is, a drop is completed (S971).

Where it is determined in operation 959 that a drag occurs, the controller 107 checks whether or not the dragged length is less than the predetermined length (S973). A drag may be caused by slight handshaking in a state in which a particular object is pressed by a user. Where the dragged length is less than the predetermined length, the controller ignores a drag caused by slight hand shaking and performs operation S961. However, where the dragged length is equal to or more than the predetermined length, the controller 107 performs operation S975 described below.

Where it is determined in operation S955 that a touch is a grab-and-drag operation, the controller 107 moves the screen (S975). Where a grab-and-drag operation is recognized, part of the application displayed on the touch screen 105 is moved.

In the another exemplary embodiment, although only one object is selected by a long press and moved by a drag, a plurality of objects may be selected by repetitively performing a process of selecting one object by a long press in operation S963, returning to operation S955 and selecting a different object by a long press, and a plurality of objects may be simultaneously moved by a drag and drop.

The another exemplary terminal apparatus and method of performing a function may easily perform switching between the grab-and-drag mode and the object-drag mode where the application is displayed, may use a relatively large screen space since a switch to switch between the above-described modes, may easily perform the grab-and-drag function and the object-drag function, and may not include a menu and an icon, thereby improving user convenience.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

As apparent from the above description, according to the exemplary embodiments, scrolling can be performed in a relatively large screen space without using a bar or a control key to perform scrolling. Scrolling can be clearly discriminated from dragging and dropping, and switching between a grab-and-drag mode and an object-drag mode can be easily performed where the application is displayed, thereby improving user convenience.

The above description also includes a terminal apparatus and a method of performing a function thereof in which an object of a list displayed on a touch screen is easily moved.

Furthermore, the above description includes a terminal apparatus and a method of performing a function thereof in which objects of a list displayed on a touch screen are easily scrolled through by a grab and drag, and objects are moved by a drag and drop in a direction perpendicular to a scrolling direction.

In addition, the above description includes a terminal apparatus and a method of performing a function thereof in which scrolling and is clearly discriminated from dragging and dropping.

Moreover, the above description includes a terminal apparatus and a method of performing a function thereof in which a particular object is selected by dragging in a direction perpendicular to a scroll direction and the selected object is easily moved by a drag and drop.

Also, the above description includes a terminal apparatus and a method of performing a function thereof in which switching between a grab-and-drag mode and an object-drag mode is easily performed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of performing a function of a terminal apparatus with a touch screen, the method comprising:
   checking a type of a touch event that occurs on an object of a list displayed on the screen;
   scrolling the list in response to the checked type indicating that the object moves in a scroll direction of the list;
   in response to the checked type indicating that the object moves in a direction perpendicular to the scroll direction, moving the object to a new area and displaying the object in the new area;
   in response to a touch event occurring in a state in which a particular application is displayed by executing a particular object of the list, checking a type of the touch event;
   in response to the checked type of touch event being a press on a particular object of the application, checking whether a pressed time is equal to or more than a predetermined time; and
   in response to the pressed time being equal to or more than the predetermined time, selecting the pressed object and moving the pressed object by a drag and drop, wherein:
   in response to the particular object being displayed, a counter to indicate the pressed time is displayed, and
   in response to the pressed time being equal to or more than the predetermined time, a display of the counter is released.

2. The method of claim 1, further comprising:
   in response to a drag input of the object with a dragged length less than a predetermined length occurring, ignoring the drag input.

3. The method of claim 1, further comprising:
in response to the checked type indicating that the object moves more than a predetermined value in the direction perpendicular to the scroll direction, dragging the object to the new area.

4. The method of claim 1, further comprising, in response to the checked type indicating that the object fails to move more than a predetermined value in the direction perpendicular to the scrolling direction, scrolling the list.

5. The method of claim 1, further comprising:
checking a type of a touch event that occurs on another object of the list;
in response to a drag, corresponding to a different object of the list, occurring in the direction perpendicular to the scroll direction, selecting the dragged different object;
repetitively checking types of touch events that occur on different objects of the list; and
dragging the objects to new areas in response to the checked types indicating that the objects move in the direction perpendicular to the scroll direction.

6. The method of claim 1, further comprising:
in response to a press applying onto the object, checking whether a pressed time is equal to or more than a predetermined time; and
in response to the pressed time being equal to or more than the predetermined time, selecting the pressed object and moving the pressed object by a drag and drop.

7. The method of claim 6, wherein:
an application that the object belongs to is initially set as a grab-and-drag mode that moves a part of the application displayed on the touch screen; and
in response to a time that the object is pressed being equal to or more than the predetermined time, the grab-and-drag mode is switched to an object-drag mode that moves only a particular object of the displayed application.

8. The method of claim 1, further comprising:
in response to the checked type of touch event being a press on the object that belongs to an application, checking whether a pressed time is equal to or more than a predetermined time; and
in response to the pressed time being equal to or more than the predetermined time, selecting the pressed object and moving the pressed object by a drag and drop, wherein the selecting of the pressed object comprises:
in response to a different object of the application being pressed, during a time equal to or more than the predetermined time, after the pressed object is selected, selecting the different object;
repetitively selecting different objects to select a plurality of objects; and
moving the selected objects by a drag and drop.

9. The method of claim 1, further comprising, in response to the checked type of touch event being a grab-and-drag event or in response to a drag with a dragged length which is equal to or more than a predetermined length, in a state in which a object of an application is being pressed, moving an application part displayed on the touch screen.

10. The method of clam 1, the method comprising:
applying, in response to a drag corresponding to the object occurring, a ghost effect to the object.

11. The method of claim 6, further comprising displaying, in response to a touch event occurring, an arrow to move an application part displayed on the touch screen.

12. The method of claim 1, wherein:
the checked type indicating the object moves in a scroll direction of the list is a grab-and-drag type; and
the checked type indicating that the object moves in the direction perpendicular to the scroll direction is a drag-and-drop type.

13. The method of claim 1, wherein the new area is a drop area located in the direction perpendicular to the scroll direction.

14. The method of claim 1, wherein the new area is a location in the list.

15. The method of claim 1, further comprising moving the object to a location in the list in response to the checked type indicating that the object moves in the perpendicular direction to the scrolling list to a drop area and then in an opposite direction back to the scrolling list.

16. A method of performing a function of a terminal apparatus with a touch screen, the method comprising:
in response to a touch event occurring in a state in which a list is displayed, checking a type of the touch event;
scrolling the list or moving a particular object of the list to a dropped area where the particular object remains depending on the checked type of touch event;
in response to a touch event occurring in a state in which a particular application is displayed by executing a particular object of the list, checking a type of the touch event;
in response to the checked type of touch event being a press on a particular object of the application, checking whether a pressed time is equal to or more than a predetermined time; and
in response to the pressed time being equal to or more than the predetermined time, selecting the pressed object and moving the pressed object by a drag and drop, wherein:
in response to the particular object being displayed, a counter to indicate the pressed time is displayed, and
in response to the pressed time being equal to or more than the predetermined time, a display of the counter is released.

17. A terminal apparatus, comprising:
a touch screen configured to receive a touch input; and
a controller configured to check a type of a touch event that occurs on an object of a list displayed on the screen, scroll the list in response to the checked typed indicating that the object moves in a direction of the list, and in response to the checked type indicating that the object moves in a direction perpendicular to a scroll direction, and move the object to a new area and display the object in the new area;
wherein the controller is further configured to:
in response to a touch event occurring in a state in which a particular application is displayed by executing a particular object of the list, check a type of the touch event;
in response to the checked type of touch event being a press on a particular object of the application, check whether a pressed time is equal to or more than a predetermined time; and
in response to the pressed time being equal to or more than the predetermined time, select the pressed object and move the pressed object by a drag and drop, wherein:
in response to the particular object being displayed, a counter to indicate the pressed time is displayed, and
in response to the pressed time being equal to or more than the predetermined time, a display of the counter is released.

18. The terminal apparatus of claim 17, wherein the controller is configured to ignore an occurrence of a drag in response to a dragged length being less than a predetermined length.

19. The terminal apparatus of claim 17, wherein the controller is configured to move the object in response to a dragged length being equal to or more than a predetermined length.

20. The terminal apparatus of claim 17, wherein:
the object remains in the new area to which the object is moved,
the controller is configured to scroll the list in response to a grab-and-drag occurring in the scroll direction.

* * * * *